"(12) United States Patent
Bellizi et al.

(10) Patent No.: US 11,866,350 B1
(45) Date of Patent: Jan. 9, 2024

(54) WATER FILTRATION SYSTEM WITH WASTE WATER TREATMENT

(71) Applicant: ApHinity, Inc., Corona, CA (US)

(72) Inventors: Christopher J. Bellizi, Lake Forest, CA (US); Stephen M. Mosher, Chandler, AZ (US)

(73) Assignee: APHINITY, INC., Corona, CA (US)

( * ) Notice: Subject to any disclaimer, the term of this patent is extended or adjusted under 35 U.S.C. 154(b) by 176 days.

(21) Appl. No.: 16/843,632

(22) Filed: Apr. 8, 2020

Related U.S. Application Data

(60) Provisional application No. 62/832,743, filed on Apr. 11, 2019.

(51) Int. Cl.
C02F 1/44 (2023.01)
C02F 5/00 (2023.01)
B01D 61/00 (2006.01)
B01D 61/02 (2006.01)

(52) U.S. Cl.
CPC ............ C02F 1/445 (2013.01); B01D 61/002 (2013.01); B01D 61/027 (2013.01); C02F 1/442 (2013.01); C02F 5/00 (2013.01); C02F 2209/055 (2013.01); C02F 2209/07 (2013.01)

(58) Field of Classification Search
None
See application file for complete search history.

(56) References Cited

U.S. PATENT DOCUMENTS

| 5,022,994 A * | 6/1991 | Avery | B01J 49/85 251/59 |
| 5,942,122 A * | 8/1999 | Iwabuchi | B01J 39/07 210/686 |
| 6,113,797 A * | 9/2000 | Al-Samadi | C02F 1/441 210/705 |
| 2009/0277841 A1* | 11/2009 | Johnson | F28F 19/00 210/663 |

FOREIGN PATENT DOCUMENTS

| CN | 105540971 A | * | 5/2016 |
| EP | 3130391 A1 | | 2/2017 |
| KR | 101530571 B1 | * | 6/2015 |
| KR | 101530571 B1 | * | 6/2015 |
| WO | WO 2017096195 A1 | | 6/2017 |

* cited by examiner

Primary Examiner — Magali P Slawski
Assistant Examiner — Brad Gordon
(74) Attorney, Agent, or Firm — Larry K. Roberts

(57) ABSTRACT

A two-stage water treatment process. In a first stage, an incoming stream of water is processed to remove impurities and produce an outgoing stream of water usable for a first purpose and a waste stream of water not suitable for the first purpose. In a second stage, the waste stream of water is processed to remove hardness and alkalinity and produce a second outgoing stream of water suitable for a second purpose. In an exemplary embodiment, the first stage is a forward osmosis or nanofiltration process, and the first purpose includes production of potable water. The second stage includes the use of a weak acid cation resin system.

13 Claims, 2 Drawing Sheets

US 11,866,350 B1

WATER FILTRATION SYSTEM WITH WASTE WATER TREATMENT

This application claims the benefit of U.S. Provisional Application No. 62/832,743 filed Apr. 11, 2019; the entire contents of which application are hereby incorporated by reference.

BACKGROUND

Nanofiltration systems are useful membrane systems to partial deionize water for many uses. One of the most beneficial aspects of nanofiltration is the water is filtered to a point to remove approximately 90% of the dissolved minerals, yet the water is not too pure such that special piping metallurgies. This is beneficial as a water purification process for existing building systems so that piping replacement isn't necessary, yet the water is substantially purified.

A detriment of nanofiltration systems (similar to reverse osmosis) is a reject (waste) stream is a necessary requirement of the system. A typical volume of the waste stream is between 15-50% of the input water stream. This can be wasteful in terms of water utilization. The primary ions in the waste stream are hardness and alkalinity while other ions can be found in lesser quantities due to poorer rejection, such as chloride, sulfate, silica and sodium.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
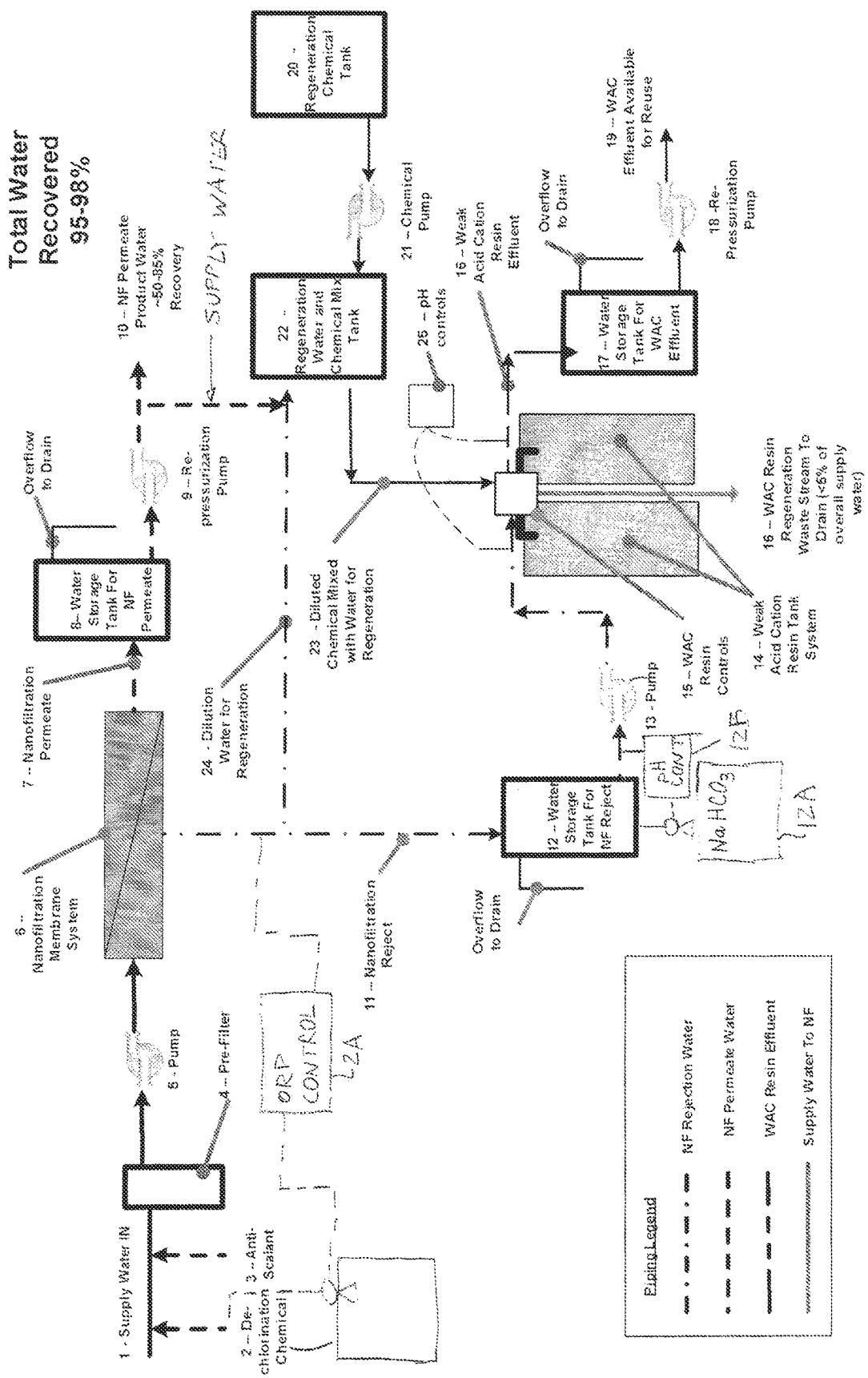
FIG. 1 is a schematic block diagram illustrating an exemplary embodiment of a two-stage water treatment system in accordance with aspects of the invention.

In the following detailed description and in the several figures of the drawing, like elements are identified with like reference numerals. The figures are not to scale, and relative feature sizes may be exaggerated for illustrative purposes.

In accordance with aspects of the invention, an exemplary embodiment of a two-step water treatment process utilizes a weak acid cation resin system to treat a nanofiltration ("NF") rejection stream to improve the overall process water recovery efficiency. The treatment of the rejection stream utilizes a weak acid cation (WAC) resin to remove hardness and other impurities from the rejection stream which can then be used for a second function. An anti-scalant may be used to treat the NF system and be also utilized to prevent mineral precipitation on the WAC resin, thus maintaining optimal efficiency in the resin system. pH control can be one method of controlling the regeneration of the resin to optimize resin capacity and thus minimizing chemical and water use.

The primary ions rejected by nanofiltration are hardness and alkalinity. In accordance with an aspect of the invention, a mechanism to further utilize the rejection stream of the nanofiltration system is to process the waste reject stream through a weak acid cation ("WAC") resin system. WAC resin systems are utilized to remove alkalinity and hardness from water streams. The WAC resin has higher affinity for hydrogen over trivalent, divalent and monovalent ions. Therefore, the regeneration of WAC resin can be completed by using a slight excess volume of acid. Thus, a low concentration can be used for the regeneration. This makes the utilization of a WAC resin system to treat the nanofiltration rejection stream a useful technology to further process the water and thus gain greater overall water efficiency utilization in the process.

WAC resin is regenerated with a weak acid, which makes the use of it an economical solution as the resin can remove ions with minimal operational cost. Examples of weak acids are as follows (but not limited to): diluted sulfuric acid, diluted hydrochloric acid, acetic acid, citric acid, and hydronium.

The risk of operating the two systems in this manner is the concentrated calcium and alkalinity levels in the rejection stream of the nanofiltration could potentially lead to calcium carbonate or calcium hydroxide precipitation on the WAC resin thus fouling it. A solution to this potential risk is to implement a specialty anti-scalant to the NF system for protecting mineral fouling on the membranes as well as using it in the NF reject or waste stream to the WAC resin system where it is also utilized as an anti-scalant for prevention of resin fouling. The effluent water produced by the WAC resin could then be further utilized in many other industrial uses such as cooling tower make up, boiler water make-up, swamp cooler make-up, fluid cooler make-up, or evaporative condenser make-up. The result of this process would utilize between 95-98% of the water stream to the nanofiltration system as compared to just the normal operation of the NF system which utilizes 50-85% of the make-up supply.

Referring now to FIG. 1, the supply water 1 is first dechlorinated 2 with either activated carbon or sodium metabisulfite which removes chlorine from the supply water which can damage the nanofiltration membranes. The next step is an NSF approved anti-scalant 3 is added to the water to help prevent mineral scaling on the membranes of the NF membrane system 6, which will also pass with the reject stream 11 and go to the weak acid cation resin system. The next step is a 5-micron bag filter 4 designed to remove any remaining suspended particles prior to the NF membranes. The water is then pumped 5 into the NF pressure vessels of the NF system 6 where the water is split into two streams: permeate 7 and rejection 11 streams. The permeate 7 is then stored in tank 8 for re-pressurization (pump 9) as NF permeate product water 10 and thus for use applications.

The rejection stream 11 is also stored but in a separate storage tank 12. The rejection stream is then pumped by pump 13 through a single, dual, or twin alternating weak acid cation resin system 14 where hardness and alkalinity are removed from the water via ion exchange. The ions removed from the water are attracted to the resin and thus removed. The ions are exchanged with hydrogen, which thus decreases the total dissolved minerals of the water.

The high concentration of the scale forming minerals on the resin pose a risk for fouling the resin. To minimize this impact, the mineral anti-scalant applied to the NF system also stays active in the reject stream 11 as it passes through to the WAC resin system 14, thus minimizing scaling on the WAC resin. This anti-scalant passes with the effluent of the WAC resin system into the final water for use applications where it can also be used for anti-scalant. The final WAC effluent water is stored in a storage tank 17 with re-pressurization pump 18 so that WAC effluent water 19 can be used on demand.

The resin is then "regenerated" as the resin becomes loaded to maximum capacity. The resin can be backwashed and regenerated with clean supply water or with NF permeate water combined in tank 22 with a weak acid of user choice (see regeneration chemical tank 20 and chemical pump 21). The regeneration activation can be controlled 25 by either a timer, flow meter, or pH controller. In the case of using pH control to actuate regeneration, the pH controller 25 measures the influent pH and effluent pH of the WAC treated water. If the differential in pH drops below 1.0 pH units, the controller signals to regenerate. If a timer is utilized to actuate regeneration, this is a simple mechanical timer with a set schedule for regeneration. A flow meter actuation measures the flow of water and as the volume of water is treated and maximum capacity is achieved, the WAC system is triggered into regeneration mode. If utilizing a "dual" or "twin" tank system as illustrated in FIG. 1, prior to regeneration of the spent tank the controls 15 switches the on-line tank to off line for regeneration and puts the off-line standby tank online so that continuous treatment of the stream of water is processed. The steps of regeneration of WAC resin are common: backwash, bed settle, acid regeneration, slow rinse, and fast rinse.

An exemplary Weak Acid Cation resin suitable for the purpose is a porous cross-linked polyacrylate of the carboxylic acid group, hydrogen form. Typical service flow rates on the resin are 1-3 gpm per cubic foot of resin. The acid used for regeneration (regeneration storage tank 20) can be any weak acid or strong acid (in a diluted form). This includes but is not limited to, acetic acid, citric acid, diluted sulfuric acid, diluted hydrochloric acid, hydronium, diluted phosphoric acid, and diluted nitric acid.

An ORP monitor 2A may be used to control the on/off operation of the dichlorination pump delivering the dechlorination chemical to the front end of the nanofilter membrane system 6.

A salt such as sodium bicarbonate in tank 12A controlled by a pH monitor 12B on the incoming water to the WAC resin vessel may be used to ensure 100% hardness removal if the incoming water hardness level is higher than the alkalinity level. The WAC resin removes equal parts hardness (calcium and magnesium) and alkalinity (carbonate and bicarbonate). Whichever is at a lower value of the two, gets 100% removed and whichever is higher of the two has the excess pass through the resin. So, if 100% hardness removal is always desired, then the sodium bicarbonate raises the alkalinity to a level just higher than the hardness so 100% hardness is removed.

Figure 2:
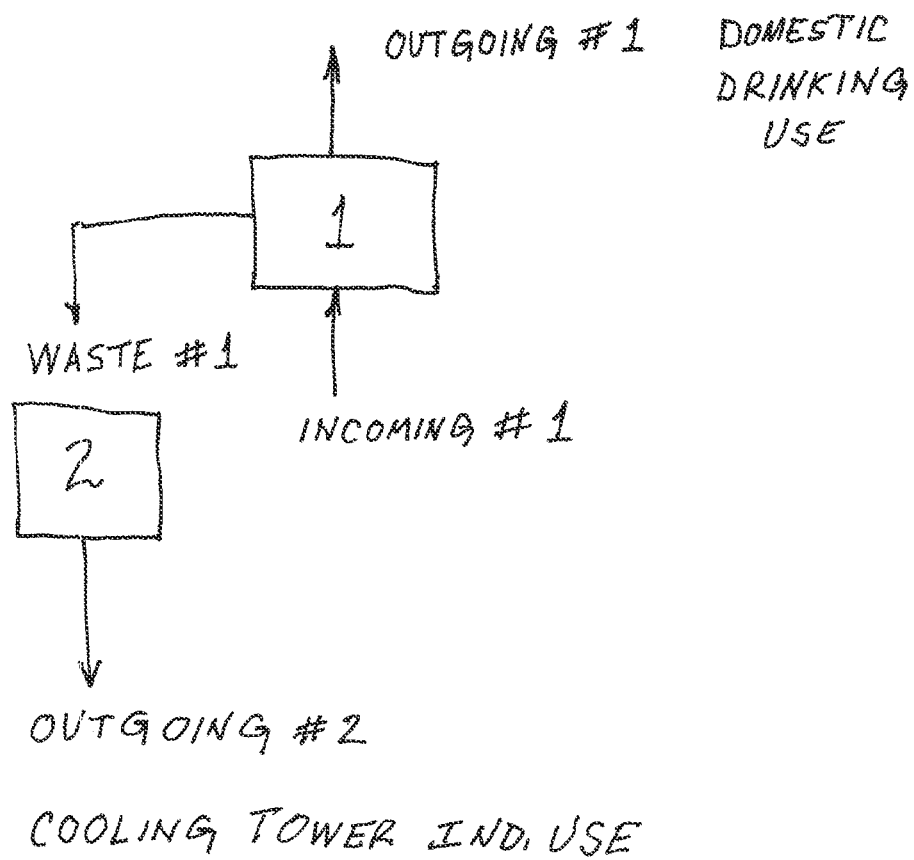
FIG. 2 is a simplified schematic block diagram illustrating a further exemplary embodiment of a two-stage water treatment process.

FIG. 2 is a simplified block diagram illustrating aspects of the invention more generally. The process involves two steps or stages, stage 1 and stage 2. Input water #1 is processed by stage 1, which results in outgoing treated water #1, which may be used for drinking water, by way of example. Stage 1 may be a nanofiltration or other treatment process, which also results in waste water #1. In accordance with an aspect of the invention, the waste water #1 is treated by a second process 2, to provide outgoing treated water 2, for use in another application, such as cooling tower makeup water, by way of example. The is also some water from process stage 2 but it is relatively small so that the overall efficiency of the process is quite high. The second process 2 may be a WAC process, for example.

Although the foregoing has been a description and illustration of specific embodiments of the subject matter, various modifications and changes thereto can be made by persons skilled in the art without departing from the scope and spirit of the invention.

What is claimed is:

1. A two-stage water treatment process to provide potable water from a first stage and to process a resulting waste stream of water to provide makeup water, the process comprising:

in a first stage, processing the incoming stream of water to remove impurities and produce an outgoing stream of potable water and a rejection stream of waste water, wherein the first stage includes a forward osmosis (FO) or nanofiltration process, the first stage comprising:

introducing a dechlorination chemical into the incoming stream of water using a dechlorination pump;

subsequently passing the incoming stream of water through a membrane of a nanofiltration or forward osmosis process, thereby producing the outgoing stream of water useable for potable water and the rejection stream of waste water;

monitoring the ORP of the rejection stream of waste water with an ORP monitor, wherein the ORP monitor controls the on/off operation of the dechlorination pump, in a second stage, processing the rejection stream of waste water to remove hardness and alkalinity and produce an outgoing stream of make-up water, wherein the second stage includes:

capturing some or all of the rejection stream of waste water in a waste storage tank holding waste water from the first stage;

storing a salt in a salt storage tank and providing a salt feed line between the salt storage tank and the waste storage tank;

pumping waste water from the waste storage tank into a waste water feed line leading to a weak acid cation resin;

monitoring, via a pH monitor, the pH of the waste water in the waste water feed line; and processing waste water from the waste water feed line through the weak acid cation resin, wherein the pH monitor controls the release of salt from the salt storage tank to the waste storage tank to raise the alkalinity of the waste water in the waste storage tank.

2. The process of claim 1, further comprising:

regenerating the resin in place as needed or periodically to remove the ions which have been removed from the waste stream of water.

3. The process of claim 2, wherein said regenerating the resin includes backwashing the resin with water combined with a weak acid.

4. The process of claim 2, wherein the pH of the outgoing stream of make-up water is monitored, via a pH controller, to control said step of regenerating the resin.

5. A two stage water treatment process, comprising:

in a first stage, processing the incoming stream of water to remove impurities and produce an outgoing stream of potable water and a rejection stream of waste water for further processing in a second stage, in a second stage, processing the rejection stream of waste water to remove hardness and alkalinity and produce a second outgoing stream of water;

wherein the first stage comprises:

introducing a dechlorination chemical into the incoming stream of water using a dechlorination pump;

subsequently passing the incoming stream of water through a membrane of a nanofiltration or forward osmosis process, thereby producing the outgoing stream of water useable for potable water and the rejection stream of waste water;

monitoring the ORP of the rejection stream of waste water with an ORP monitor, wherein the ORP monitor controls the on/off operation of the dechlorination pump;

wherein the second stage comprises:
capturing some or all of the rejection stream of water as waste water in a waste storage tank holding waste water from the first stage;
feeding waste water from the waste storage tank through a waste water feed line leading to a weak acid cation resin;
monitoring, via a pH monitor, the pH of the waste water flowing through the waste water feed line;
controlling, via the pH monitor, the introduction of a salt into the waste storage tank to raise the alkalinity of the waste water in the waste storage tank; and
passing the waste water flowing through the waste water feed line through the weak acid cation resin to produce the second outgoing stream of water.

6. The process of claim 5, wherein said salt is sodium bicarbonate.

7. The process of claim 5, further comprising:
regenerating the weak acid cation resin in place as needed or periodically to remove the ions which have been removed from the rejection stream of waste water.

8. The process of claim 7, wherein said regenerating includes backwashing the resin with water combined with a weak acid.

9. A two-stage water treatment process for processing an incoming stream of water, comprising:
in a first stage comprising a forward osmosis or nanofiltration process, processing the incoming stream of water to remove impurities and produce an outgoing stream of water usable for potable water and a rejection stream of waste water, the first stage comprising:
introducing a dechlorination chemical into the incoming stream of water using a dechlorination pump;
subsequently passing the incoming stream of water through a membrane of a nanofiltration or forward osmosis process, thereby producing the outgoing stream of water useable for potable water and the rejection stream of waste water;
monitoring the ORP of the rejection stream of waste water with an ORP monitor, wherein the ORP monitor controls the on/off operation of the dechlorination pump, the two-stage water treatment process further comprising, in a second stage including a weak acid cation resin, processing the waste water to remove hardness and alkalinity and produce an outgoing stream of processed water, wherein the second stage includes:
capturing some or all of the rejection stream of water in a waste storage tank holding waste water from the first stage;
storing a salt in a salt storage tank and providing a salt feed line between the salt storage tank and the waste storage tank;
pumping the waste water from the waste storage tank into a waste water feed line leading to the weak acid cation resin;
monitoring, via a pH monitor, the pH of the waste water in the waste water feed line;
controlling, via the pH monitor, the introduction of a salt into the waste storage tank to raise the alkalinity of the waste water in the waste storage tank;
processing the waste water through the weak acid cation resin to remove hardness and alkalinity from the waste water, via ion exchange, and produce the outgoing stream of processed water; and
storing the processed water in a processed water storage tank.

10. The process of claim 9, further comprising:
regenerating the weak acid cation resin as needed or periodically to remove the ions which have been removed from the waste water.

11. The process of claim 10, wherein said regenerating includes backwashing the resin with the waste water combined with a weak acid.

12. The process of claim 11, further comprising:
monitoring, via a pH controller, the pH of the waste water delivered to the weak acid cation resin and the pH of the processed water;
initiating, via the pH controller, said step of regenerating the resin if the differential in pH between the waste water and the processed water drops below 1.0 pH units.

13. The process of claim 9, further comprising:
pumping the processed water from the processed water storage tank for use as makeup water.

* * * * *